United States Patent [19]
DeVault et al.

[11] 3,852,252
[45] Dec. 3, 1974

[54] PURIFICATION OF HIGH MOLECULAR WEIGHT POLYMERS TO REDUCE HYDROGENATION CONDITIONS

[75] Inventors: Albert N. DeVault; Marvin M. Johnson, both of Bartlesville, Okla.

[73] Assignee: Phillips Petroleum company, Bartlesville, Okla.

[22] Filed: Oct. 26, 1970

[21] Appl. No.: 84,154

Related U.S. Application Data
[63] Continuation of Ser. No. 811,197, March 27, 1969, abandoned.

[52] U.S. Cl............ 260/85.1, 260/82.1, 260/94.7 H, 260/96 H
[51] Int. Cl.............................................. C08d 5/02
[58] Field of Search........................ 20/94.7 H, 85.1

[56] References Cited
UNITED STATES PATENTS

| | | | |
|---|---|---|---|
| 2,864,809 | 12/1958 | Jones et al. | 260/85.1 |
| 3,113,986 | 12/1963 | Breslow et al. | 260/683.9 |
| 3,164,578 | 1/1965 | Baker et al. | 260/94.9 |
| 3,205,278 | 9/1965 | Lapporte | 260/667 |
| 3,209,050 | 9/1965 | Hanson | 260/681.5 |

*Primary Examiner*—Joseph L. Schofer
*Assistant Examiner*—William F. Hamrock

[57] ABSTRACT

The severity of hydrogenation conditions of temperature, pressure and catalyst consumption required by high molecular weight elastomeric, thermoplastic and thermosetting polymers can be substantially reduced by pretreating the polymer with molecular sieves before hydrogenation.

3 Claims, No Drawings

PURIFICATION OF HIGH MOLECULAR WEIGHT POLYMERS TO REDUCE HYDROGENATION CONDITIONS

This is a continuation of Ser. No. 811,197, filed Mar. 27, 1969, now abandoned.

This invention relates to a method for substantially reducing the severity of hydrogenation conditions required by high molecular weight polymers and copolymers. In still another aspect, it relates to the use of molecular sieves in a method for removing interfering substances from high molecular weight elastomeric, thermoplastic and thermosetting polymers, and from such polymers dissolved in organic solvents, so that subsequent hydrogenation can be accomplished under substantially milder conditions of temperature, pressure, and catalyst consumption.

Many high molecular weight elastomeric, thermoplastic, and thermosetting polymers, such as copolymers of butadiene and styrene, conventionally are hydrogenated. Hydrogenation reduces substantially the olefinic double bonds of the polymer and to a much lesser extent phenyl groups when present in the polymer. Hydrogenation improves the physical and chemical properties of the polymers for many purposes. Hydrogenation increases viscosity of the polymer, removes sites of potential oxidation and degradation, and thus promotes stability of the polymer. Hydrogenated copolymers of butadiene and styrene, for example, have many useful applications, among them use as modifiers for increasing the viscosity and improving the shear stability and viscosity index of lubricating oils, particularly the paraffinic base lubricating oils.

Hydrogenation of polymers containing olefinic unsaturation heretofore has been accomplished by subjecting the polymer or copolymer to elemental hydrogen under conditions of relatively high pressure and high temperature. The process further has had relatively high catalyst consumption rates. Substantial reductions in temperature, much lower pressures, and greatly reduced catalyst requirements per pound of polymer, all would represent substantial savings in operating and production costs, equipment requirements, expensive catalyst needs, and thus represent substantial overall reductions in production costs of the polymers.

We have discovered that outstanding improvements by reduction in severity of the conditions needed for hydrogenation of polymers are obtained when the polymer is first treated with molecular sieves before hydrogenation. Treatment of the polymer with specifically sized molecular sieves appears to remove from the polymer components which otherwise require relatively severe and expensive hydrogenation conditions of high pressure, high temperature, and high catalyst consumption rates. More specifically, it has been found by this invention that treatment of a high molecular weight unsaturated polymer, preferably as a solution, with molecular sieves of suitable pore diameters prior to hydrogenation is highly beneficial to a surprising extent to the subsequent hydrogenation process conditions.

Therefore, it is an object of this invention to provide a method of producing high molecular weight elastomeric, thermoplastic, and thermosetting polymers and copolymers which can be hydrogenated under substantially milder hydrogenation conditions.

It is a still further object of this invention to provide a method of the use of molecular sieves in removing components from polymer compositions so as to reduce substantially the catalyst consumption and requirements of temperatures and pressures for hydrogenation of the unsaturated polymer.

It is a further object of this invention to provide a method for the use of molecular sieves for the treatment of butadiene-styrene copolymers and solutions thereof.

It is another object of this invention to provide a method for substantially reducing the severity of hydrogenation conditions required by copolymers of butadiene and styrene.

Other objects and aspects of this invention together with the several advantages of this invention will be apparent to those skilled in the art to which it pertains from knowledge gained from the following description given herein, together with the appended claims.

In accordance with this invention, high molecular weight polymers which contain unsaturation are treated under essentially anhydrous conditions by contact with molecular sieves. The polymer so treated with the molecular sieves then is hydrogenated. The treated polymer requires substantially less catalyst for hydrogenation, and can be hydrogenated at substantially lower pressures and temperatures, than does the same polymer which has not been treated with the molecular sieves.

The molecular sieves applicable to our invention are the various naturally-occurring zeolites, or synthetic zeolites or metal aluminosilicates. The synthetic products are preferred due to precise control of form and pore size. Molecular sieves have a three-dimensional, interconnecting network structure of silica and alumina tetrahedra. The tetrahedra are formed by four oxygen atoms surrounding a silicon or aluminum atom. Each oxygen has two negative charges and each silicon has four positive charges. The trivalency of aluminum causes the alumina tetrahedron to be negatively charged which then requires an additional cation to balance the system. The final structure generally has sodium, potassium, or calcium in the network. These cations are the exchangable ions of the zeolite structure. Quadravalent silicon atoms can be replaced by trivalent aluminum atoms in various ratios which then alter the crystal structure of the zeolite.

The crystalline network as formed contains water of hydration which can be removed from the cavities by moderate heating without changing the crystalline structure. A highly porous structure remains which has an affinity for molecules of definite size and shape. The void volumes remaining after removal of the water varies from about 45 to about 51 volume per cent (0.28 to 0.35 cc/g), and the internal surface area is in the range of from about 700 to about 800 square meters per gram.

Commercially available synthetic molecular sieves have a structure sufficiently close to naturally-occurring minerals to be classified as zeolites. The pore size of a given type is uniform through the crystal, and there is no apparent pore size distribution. This high degree of uniformity permits the sieving or trapping or separation of molecules of various diameters. The elasticity and kinetic energy of the incoming molecules, the adsorbate, allow easy passage of molecules up to about 0.5 Angstrom units larger than the free diameter of the molecular sieve pore opening. Molecular sieves retain adsorbates by strong physical forces rather than by chemisorbtion. Thus, when an adsorbed molecule is desorbed, either by heat or displacement with some other material, it leaves the crystal in the same chemical state as when it entered.

In addition to separation by molecular size and configuration, molecular sieves can adsorb materials preferentially based on polarity or degree of unsaturation. For example, in a mixture of molecules small enough to enter the pores, the less volatile, the more polar, or the more unsaturated a molecule is, then the more tightly it is held within the crystal zeolite. Since the diameter of an internal cavity of a unit cell is so exceedingly small, only a monomolecular layer of adsorption is normally possible, except for some extremely small molecules, such as water or hydrogen, having diameters less than about 4 Angstrom units. The amount of material adsorbed increases rapidly to equilibrium value as the adsorbate concentration increases.

Examples of molecular sieves which are available commercially include those known in the trade as 3A, 4A, 5A, 10X and 13X. More complete description can be found in references such as C. K. Hersh, "Molecular Sieves," Reinhold Publishing Corporation, New York City, 1961. The parent molecular sieve of the A group is the 4A which has sodium cations partially blocking the pores so that the effective opening is about 4 angstrom units. The 3A molecular sieve is a modified 4A wherein most of the blocking sodium cations have been replaced with potassium cations, which, being larger, block a greater portion of the pore opening and so reduces the effective size of the opening. The 5A sieve also is a modified 4A, wherein the blocking sodium cations have been replaced by calcium cations. Since each calcium ion replaces two sodium ions, the number of cations is reduced. This causes most of the pore openings to be essentially unblocked and the resulting effective pore opening is nearly 5 Angstroms.

The corresponding parent molecular sieve of the X series is the 13X, which is also in the sodium form and contains pore openings of about 10 Angstrom units. The 10X molecular sieves are also commercially available and presumably are formed by cation exchange of sodium with potassium to give resulting effective pore diameters of about 8 Angstrom units. The molecular sieves applicable to this invention are those wherein the pore diameters are from about 8 Angstrom units to about 12 Angstrom units, preferably approximately in the area of 10 Angstrom units.

The unit cell formulas of the types A and X have been given as follows:

Type 4A: $Na_{12}[(AlO_2)_{12}(SiO_2)_{12}] \cdot 27\ H_2O$

Type 13X: $Na_{86}[(AlO_2)_{86}(SiO_2)_{106}] \cdot 276\ H_2O$

Molecular sieves are less sensitive to system temperatures than are other adsorbants such as silica gel, sodium aluminate, activated charcoal, kaolin, and the like. However, with molecular sieves, localized ares of high temperature created by heat of adsorption can influence behavior. The adsorbate is always held in liquid form, even though adsorption may have been from a completely gaseous system. Rise in temperature of molecular sieves on contact with the vapor is a result of phase change from gas to liquid, with the heat produced being a combined result of heat of condensation plus heat of wetting of surface. Pressure has little effect on performance of molecular sieves in the range usually encountered in commercial operations. The pressure desired in a particular operation depends on the necessities of process temperatures, and desirability of maintenance of solution versus gaseous phase operations.

Molecular sieves are commercially available in various physical forms such as in granular forms of ⅛ to ¼ inch pellets, in beads, or in finely divided forms up to 200 mesh. The particular physical form of the molecular sieve material, pellet, bead, powder, finely divided, does not affect the pore diameter of the molecular sieve. Contacting of the polymer for cleaning thereof can be carried out in any suitable zone, such as a fixed bed, moving bed, or the like, known to the art.

The unsaturated polymers and copolymers of elastomeric, thermoplastic, and thermosetting types to which our invention are most applicable have molecular weights in the approximate range of 25,000 to 125,000. These polymers, which are to be hydrogenated after treatment by the method of our invention, include polyethylene, polypropylene, polybutadiene, butadiene styrene copolymers, ethylene propylene diene terpolymers, ethylene butadiene copolymers, acrylonitrile butadiene styrene terpolymers, and the like.

In discussing and describing our invention and the process of our invention and its application, the examples will describe the application to butadiene styrene copolymers with particularity. Such particular descriptions should not be considered as being limitative of the polymers to which our invention is applicable. The process of our invention is applicable to any of the known elastomeric, thermoplastic, or thermosetting polymers that contain residual unsaturation and are to be hydrogenated.

The copolymer of butadiene styrene to which our invention is illustratively applied is one containing from about 30 to about 44 parts by weight butadiene to 100 parts by weight of total monomers. The values for the butadiene content of the polymers are actually those of the butadiene and the monomers charged to the polymerization zone. However, these values are very close to those for the butadiene content of the polymers since essentially complete conversion is obtained in all polymer runs. These butadiene styrene copolymers have a vinyl content before hydrogenation of less than about 35 weight per cent. Hydrogenation results in olefinic group hydrogenation of about 95 weight per cent or more, and phenyl group hydrogenation of about 5 per cent by weight or less.

The butadiene styrene copolymers to which we refer can be prepared by any of the conventional techniques known in the art, such as those described in U.S. Pat. No. 2,975,160, R. P. Zelinski, issued Mar. 14, 1961. For example, a mixture of butadiene and styrene monomers can be polymerized using butyllithium as a catalyst and tetrahydrofuran as a randomizing agent.

While it is possible to contact the polymer itself directly with the molecular sieves, ordinarily this would not be the preferred method because of the usually high viscosity of the polymer. For this reason, it is preferred to form a solution of the polymer in a solvent such as cyclohexane, methylcyclohexane, benzene, or mixtures thereof, and the like. These polymer-solvent solutions are sometimes termed rubber cements. The concentration of polymer in the solution can vary over a wide range, the primary considerations being viscosity of the solution and ease of handling. The higher molecular weight higher viscosity liquid polymers and the solid polymers are preferably treated in relatively dilute solutions, while the less viscous liquid polymers may be treated in more concentrated solutions. With the butadiene-styrene copolymers, generally the concentration of the rubbery polymer is most easily treated when between 3 and about 30 weight per cent of polymer in solvent. Naturally, it is desirable that the volume of solution to be treated be held to a minimum consistent with handling requirements.

The polymer-solvent solution should be in a substantially anhydrous condition before treating with the molecular sieves to remove the components and substances which interfere in hydrogenation procedures. Substantially anhydrous conditions increase considerably the capacity of the absorbent molecular sieves as to the amount of polymer-solvent solution that can be handled before regeneration of the molecular sieves becomes necessary. Since it is not normally practical to dry a polymer-solvent solution by distillation unless the distillation temperature is below the decomposition point of the polymer, treatment for drying usually is most conveniently by means of a dessicant such as anhydrous calcium sulfate, anhydrous calcium chloride, alumina, and the like.

The process conditions employed for contacting the molecular sieves with the polymer-solvent solutions can vary considerably. The contacting temperature can be from about 0° to about 200° F., more usually from about 70 to 120° F. The contacting pressure can be from 0 to about 500 psig, though preferably a sufficient pressure to maintain the solution in a substantially liquid condition at the contacting temperature is employed. A space velocity of from about 0.1 to 50 liquid volumes of solution per volume of molecular sieve per hour, preferably from about 0.5 to 20 volumes, is suitable.

When the method of the invention is employed as a batch-wise treatment of polymer-solvent solutions, the contact is accomplished by either adding the molecular sieves to the solution or the solution to the molecular sieves. The resulting batch suspension usually is stirred for a time required for the molecular sieves to properly treat the solution. Such contact time will vary from about 0.1 to 48 hours, more usually 0.1 to 24 hours, depending on the monomer or monomers, the polymers, and the solution viscosity.

After treatment of the polymer-solvent solution with the molecular sieves, the polymer is hydrogenated for the purposes as hereinbefore discussed. The hydrogenation can be carried out in any manner known in the art, such as the process of U.S. Pat. No. 2,864,809, R. V. Jones et al., issued Dec. 16, 1958, or that of U.S. Pat. No. 3,113,986, D. S. Breslow et al., issued Dec. 10, 1963, or that of U.S. Pat. No. 3,205,278, S. J. Laporte, issued Sept. 7, 1965.

For example, a copolymer of butadiene styrene can be hydrogenated over a reduced nickel-kieselguhr catalyst or over a nickel octoate-triethylaluminum catalyst system.

Normally, the polymers are hydrogenated sufficiently to remove substantially all of the olefinic unsaturation, leaving primarily only the unsaturation attributable to the aromatic or phenyl groups, if any, remaining. More particularly, the butadiene-styrene copolymers are hydrogenated to reduce approximately 95 per cent by weight of the olefinic group or greater, and of the phenyl group, only 5 per cent by weight or less would be hydrogenated under conditions in the herein mentioned patents.

The molecular sieves can be cleaned after an interval of usage so as to restore effectiveness. Basic methods of cleaning, desorption, of molecular sieves are classified as thermoswing, pressure swing, purged gas stripping, and displacement. Thermoswing employs a different temperature level for adsorption and desorption. On desorption, the molecular sieves are heated to a temperature at which adsorptive capacity is reduced to a low level so that the adsorbate leaves the molecular sieve surface and is readily removed by a small stream of purge gas such as hydrogen, or air. This often can be done at operating or even at reduced pressure. Generally, it is most convenient to carry out the regeneration of the molecular sieves at approximately the system pressure used in the treatment of the polymer solution.

The pressure swing method depends on reducing the adsorptive capacity of the molecular sieves by lowering the pressure while maintaining essentially constant temperature. The purge gas stripping method removes the adsorbate without any temperature change, but requires that the fluid so used contain no molecules that would adsorb on the molecular sieves and the adsorbate should preferably be soluble or miscible with the purge gas. The displacement method utilizes differences in affinity of the adsorbate for different molecules and obtains desorption by passing an adsorbable fluid through the adsorbent which displaces all or part of the previously adsorbed material.

We have found convenient the thermoswing method for desorption or cleaning of the molecular sieves. While lower temperatures are usually preferred for safety to the molecular sieves, it may be necessary to employ temperatures of up to 900° or 950° F. in a nitrogen-air mixture having a volume ratio of nitrogen to air of about 4 to 1 for difficulty removable adsorbates. Where hydrogen is used to regenerate the molecular sieves, a regeneration temperature of from 300° to 600° F., more usually 350° to 450° F., can be used. After removal of most of the impurities, it may be desirable to treat for a short period with air alone to burn out any residual difficultly-removable materials. It is also within the scope of the invention to simply sweep the catalyst with an inert gas such as methane, nitrogen, and the like to remove the impurities. Depending on the impurities present, temperatures in the range of 500° to 1,000° F. can be used.

After regeneration, the molecular sieves can be prewetted, if desired, before being further used in treatment of polymer or polymer solutions. Prewetting minimizes heat of wetting on contact of the newly regenerated molecular sieves with fresh polymer or polymer solution. The heat of wetting can be reduced by initially feeding to the molecular sieves some of the solvent used in preparation of the polymer solution, preferably feeding the solvent in small amount as a dilute vapor, preferably mixed with an inert gas such as nitrogen.

Other methods can be employed to prewet the adsorbent such as feeding small amounts of inert liquids which, in themselves, will not contaminate the polymer solution to be subsequently treated. Of course, such liquids or fluids should be relatively pure, moisture free materials, not detrimental in the polymer solution and which would not act to interfere in hydrogenation of the polymer after cleaning with the molecular sieve.

The prewetting step, when employed, can be accomplished by any suitable method. Such as passing previously dried wetting liquid or fluid through the bed of molecular sieves, followed by blowing out any excess liquid.

Following the prewetting step, the molecular sieves are in readiness for reuse under the procedure of this invention for cleaning of polymer and polymer-solvent solutions or rubber cements so as to place such polymers in a condition for most efficient hydrogenation at minimum hydrogenation condition requirements.

Although the process of this invention is illustrated by the purification of an elastomeric butadiene/styrene copolymer, it is applicable to any of the known elastomeric, thermoplastic, or thermosetting polymers that contain residual unsaturation and are to be hydrogenated. Examples of other polymers that can be used are polybutadiene, polyethylene, ethylene-propylenediene terpolymers, ethylene-butadiene copolymers, acrylonitrile-butadiene-styrene terpolymers, and the like.

EXAMPLE

A cyclohexane solution of a high molecular weight butadiene-styrene copolymer was prepared. The butadiene-styrene copolymer used to demonstrate the process of the invention was prepared using the following recipe and conditions:

|  | Parts by Weight |
|---|---|
| Cyclohexane | 664 |
| Tetrahydrofuran | 1.5 |
| Butadiene | 38 |
| Styrene | 62 |
| n-Butyllithium initiator | 1.5 |

The charge order of the ingredients to the polymerization zone was as follows: Half of the solvent, tetrahydrofuran, butadiene, and styrene, then the balance of the solvent and the n-butyllithium. Prior to charging the n-butyllithium, the mixture was heated with agitation to about 130° F. under autogenous pressure (about 35 psig). The temperature peaked at about 220° F. 5 minutes after addition of the n-butyllithium, and the reaction was continued for an additional 15 minutes. The resulting polymer had a number-average molecular weight of about 58,000, calculated from inherent viscosity. The polymer was then dissolved in cyclohexane. The concentration of the polymer in the resulting solution was about 13 weight per cent.

Thereafter, the solution was divided into two portions and conditions determined for substantially complete hydrogenation as hereinbefore defined, and the optimum conditions determined for Sample A, which was hydrogenated directly, and for Sample B, which was pretreated according to our invention with a ⅛-inch bead-type molecular sieve having an average pore diameter of approximately 10 Angstrom units at ambient temperature, 50 psig pressure, and a space rate of about 9 volumes of polymer cement per volume of sieve per hour prior to hydrogenation. Conditions for each sample were as follows:

Sample A (not treated by our invention):
Nickel Octoate-triethylalumium hydrogenation catalyst required: 16 mhr (mols/100 parts by weight of rubber)
Hydrogenation Pressure required: 300 psi
Hydrogenation Temperature required: 300° F.

Sample B (treated according to our invention with a 10 Angstrom Unit molecular sieve for 15 hours before hydrogenation):
Nickel Octoate-Triethylaluminum hydrogenation catalyst required: 2 mhr
Hydrogenation Pressure required: 200 psi
Hydrogenation Temperature required: 150° to 180° F.

The data from this example demonstrate the highly effective results obtained by pretreatment of the polymer with molecular sieves according to this invention. The results demonstrate the considerable savings to be obtained in reduced catalyst consumption rates, as well as in the reduced pressure and temperature levels required for effective hydrogenation.

Reasonable variations and modifications of this invention are possible within the scope of this disclosure without departing from the scope and spirit as disclosed herein.

We claim:

1. A method for hydrogenating an unsaturated butadiene/styrene copolymer, which comprises:
   a. dispersing said butadiene/styrene copolymer in a hydrocarbon solvent, thereby forming a solution of said copolymer and said solvent,
   b. contacting said solution from said step (a) with a molecular sieve having an effective pore diameter of from about 8 to about 12 Angstrom units, under substantially anhydrous conditions at a temperature of from about 0° to 150° F., a pressure of from about 0 to 500 psig, and a space velocity of from about 0.1 to 50 liquid volumes per volume of said molecular sieve per hour, and
   c. hydrogenating the treated solution from said step (b), wherein the said hydrogenation step (c) is conducted with a nickel octoate-triethylaluminum catalyst.

2. The process of claim 1 wherein said solution consists of from about 3 to about 30 weight per cent high molecular weight butadiene-styrene copolymer in cyclohexane, and said copolymer has a molecular weight of from 25,000 to 125,000.

3. The process of claim 2 wherein said contacting step (b) is carried out at a temperature of from about 70° to about 120° F., a pressure sufficient to maintain said solution in a substantially liquid condition, and a space velocity of from about 0.5 to about 20 liquid volume per volume of said molecular sieve per hour.

* * * * *